(12) United States Patent  
Günzing et al.

(10) Patent No.: US 8,450,667 B2  
(45) Date of Patent: May 28, 2013

(54) FLEXIBLE, ELECTRICALLY HEATABLE HOSE

(75) Inventors: Hans-Jürgen Günzing, Bottrop (DE); Gerd Osterholt, Dorsten (DE)

(73) Assignee: Masterflex SE (DE)

( * ) Notice: Subject to any disclaimer, the term of this patent is extended or adjusted under 35 U.S.C. 154(b) by 606 days.

(21) Appl. No.: 12/613,277

(22) Filed: Nov. 5, 2009

(65) Prior Publication Data

US 2010/0126986 A1    May 27, 2010

(30) Foreign Application Priority Data

Nov. 5, 2008    (DE) .......................... 10 2008 055 891

(51) Int. Cl.
| | |
|---|---|
| *H05B 6/10* | (2006.01) |
| *H05B 3/34* | (2006.01) |
| *H05B 3/54* | (2006.01) |
| *H05B 6/64* | (2006.01) |

(52) U.S. Cl.  
USPC ............................ 219/643; 219/549; 219/678

(58) Field of Classification Search  
USPC .................. 219/643, 418, 549, 678; 138/123, 138/127  
See application file for complete search history.

(56) References Cited

U.S. PATENT DOCUMENTS

| | | | | |
|---|---|---|---|---|
| 3,814,138 A | * | 6/1974 | Courtot .......................... | 138/124 |
| 2002/0112770 A1 | * | 8/2002 | Fisher et al. .................. | 138/137 |

FOREIGN PATENT DOCUMENTS

| | | |
|---|---|---|
| DE | 2424665 B2 | 11/1975 |
| DE | 3332551 A1 | 3/1985 |
| DE | 202005004602 U1 | 8/2005 |
| DE | 202006020466 U1 | 10/2008 |
| EP | 0312204 A2 | 4/1989 |
| GB | 2065430 A | 6/1981 |

* cited by examiner

*Primary Examiner* — Chuong A. Luu  
(74) *Attorney, Agent, or Firm* — Hovey Williams LLP

(57) ABSTRACT

A flexible, electrically heatable hose having an elongated electrical conductor which extends in the helical shape in the hose direction is illustrated and described. The object of providing a flexible, electrically heatable hose in which uniform heating over the hose length is ensured even in the event of major deformation of the hose, is achieved by a hose which has an elongated electrical conductor which extends in a helical shape in the hose direction, wherein the electrical conductor is embedded in a braid. In this case, the braid has first and second strands, wherein the first strands extend in a helical shape in the hose direction in the same winding direction as the electrical conductor, and the second strands extend in a helical shape in the hose direction in the opposite winding direction to the electrical conductor. The pitch angle of the electrical conductor, which extends in a helical shape in the hose direction, of the first strands and of the second strands is in this case between 50° and 80°.

20 Claims, 11 Drawing Sheets

US 8,450,667 B2

FLEXIBLE, ELECTRICALLY HEATABLE HOSE

CROSS-REFERENCE TO RELATED APPLICATION

Figure 1:
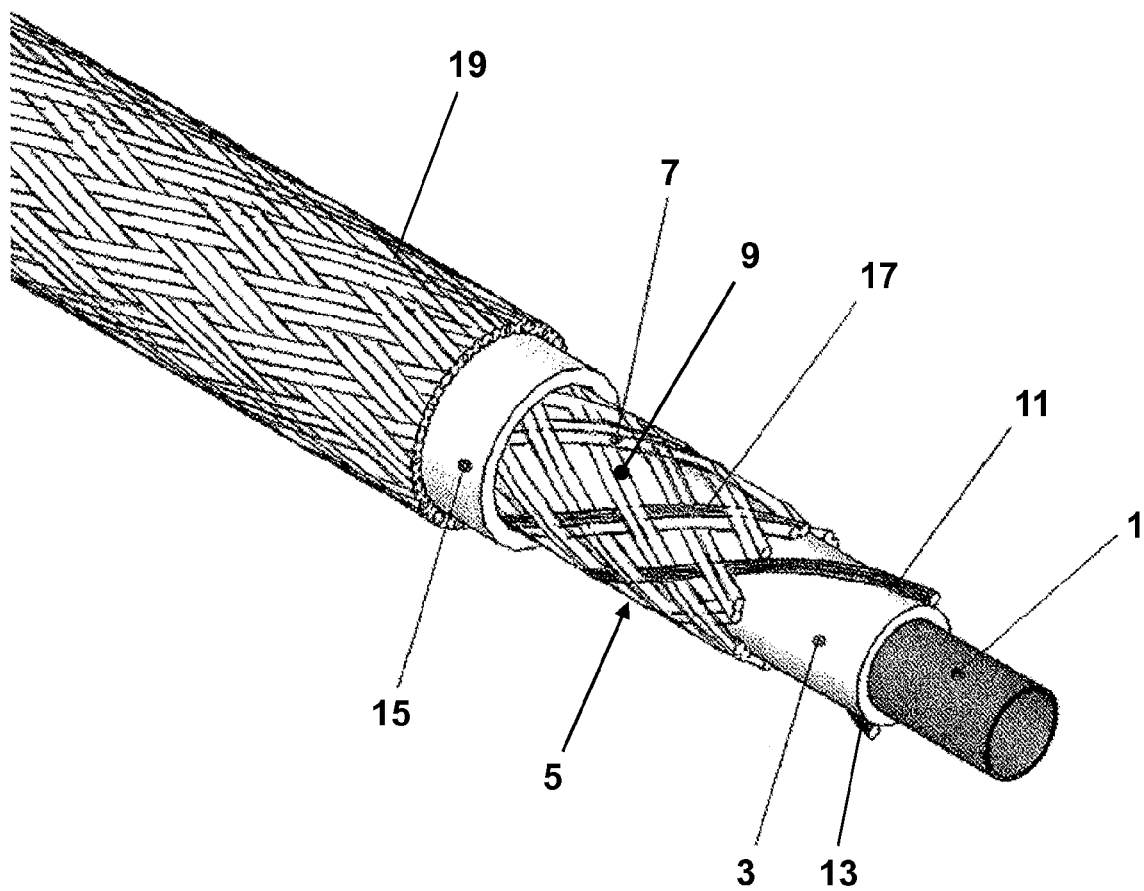

The present application claims the benefit of and priority from German Patent Application Serial No. DE 10 2008 055 891.5, filed Nov. 5, 2008, the entire disclosure of which is hereby incorporated by reference herein.

BACKGROUND OF THE INVENTION

1. Field of the Invention

The present invention relates to a flexible, electrically heatable hose having an elongated electrical conductor, which extends in the helical shape in the hose direction.

2. Discussion of the Prior Art

In a multiplicity of processes for production or conveying of products, flow metering of liquid or gaseous substances, transport of gases or liquids or of products in the form of dust, and for conveying of heat carriers for heat treatment of substances through flexible hoses, it is necessary to supply an amount of heat externally, in order to maintain the temperature of the substances or even to increase the temperature of the substances.

In this case, the maintenance of the temperature of the medium which is carried in a hose is a process in which the proportion of the heat energy which flows to the outside because of the lack or inadequate thermal insulation, and is lost, must be compensated for by a suitable external heat supply.

Thermal insulating materials cannot physically completely prevent the heat loss originating from a heated surface, but can only reduce it. The extent of the reduction depends on the extent of the insulation and on the specific thermal conductivity of the insulating material. However, excessive layer thickness of the insulating material considerably restricts the mobility of a hose system.

In addition to thermal insulation, electrical heating can be provided in the hose in order to maintain a temperature, the effectiveness of which is dependent to a major extent on the efficiency of the electrical heating and therefore on the contact between a heating element and the surface to be heated within the hose arrangement. Electrically heatable hoses are used in many technical fields. In this case, an increase in demand has been observed for particularly flexible hose systems. These systems are used, for example, in the field of automation, for example on robots in the automobile industry.

The fundamental requirements for electrically heatable hoses are a high level of bending strength and torsional strength, with a long life at the same time. A further factor at the same time is the desire for technically proven and economic heating of a hose system.

One heatable hose system is known from GB 2 065 430 A. In this case, an inner hose is sheathed with a layer which produces heat and in which a plurality of electrical conductors are embedded. The heat-producing layer is composed of carbon-doped plastic, as a result of which it conducts electric current when an electrical voltage is applied between two conductors. The resistance of the layer produces heat, which is emitted to the medium being carried in the hose.

EP 0 312 204 A2 likewise discloses the provision of an electrically conductive polymer with a positive temperature coefficient (PTC) as a heat-producing layer in an electrically heatable hose, wherein two electrodes of opposite polarity are arranged in a helical shape and each make electrical contact with the heat-producing layer.

DE 20 2005 004 602 U1 likewise discloses a heated hose line for liquids, which has a central layer composed of an electrically conductive polymer with a positive temperature coefficient. Two heat conductor wires, which extend along the hose, are embedded in the electrically conductive polymer layer, in order to supply voltage to the electrically conductive polymer layer, which is used as a heating element.

However, the hose systems which are known from the prior art have the problem that there is a very major risk of the live electrical conductors losing their electrical contact with the heating element locally when the flexible hose being subjected to very severe and frequent tensile, bending and torsion loads. The contact for heat transmission between the conductor and an inner hose carrying the medium is frequently not ensured, in the event of major deformation of the hose, even in the case of systems in which an electrical conductor is itself used as the heating element.

Furthermore, corrosion can occur on the conductor surface in those conductor sections in which the contact between the electrical conductor and the heating element or the inner hose has been lost by severe and frequent tensile, bending and torsion loads. This corrosion, which results in a greater contact resistance between the live conductor and the heating element, reduces the heat produced in the corresponding area of the inner hose and can thus in some cases result in points with less heating or even no heating. In the event of severe and major deformation, the previously known hoses therefore cannot guarantee uniform heating over the entire hose length.

SUMMARY

The object of the present invention is therefore to provide a flexible, electrically heatable hose in which uniform heating over the hose length is ensured even in the event of major deformation of the hose.

This object is achieved by a flexible, electrically heatable hose extending along a longitudinal axis in a hose direction and configured for containing a flowable medium. The hose includes an elongated electrical conductor extending in a helical shape in the hose direction to define a winding direction. The electrical conductor is embedded in a braid. The braid includes first and second strands. The first strands extend in a helical shape in the hose direction in a first strands winding direction that is the same as the winding direction of the electrical conductor. The second strands extend in a helical shape in the hose direction in a second strands winding direction that is the opposite of the winding direction of the electrical conductor. The electrical conductor presents a pitch angle of the first strands and of the second strands that extends in a helical shape in the hose direction. The pitch angle is between 50° and 80°.

The flexible, electrically heatable hose according to the invention, which has an elongated electrical conductor which extends in a helical shape in the hose direction, is characterized in that the electrical conductor is embedded in a braid. In this case, the braid has first and second strands wherein the first strands extend in a helical shape in the hose direction in the same winding direction as the electrical conductor and wherein the second strands extend in a helical shape in the hose direction in the opposite winding direction to the electrical conductor. The pitch angle of the electrical conductor, which extends in a helical shape in the hose direction, of the first strands and of the second strands is between 50° and 80°.

In this case, the expression "helical shape" is not just restricted to a helical line on a cylindrical envelope surface, but to any helical line forms which extend around an elongated volume with any desired cross-sectional shape. For example, the volume surrounded by a helix for the purposes of this invention may be hexagonal, octagonal, or may have any desired cross-sectional shape. The shape and size of the cross-sectional area of the elongated volume surrounded by a helix for the purposes of this invention also need not be constant over its entire length, but may vary.

For the purposes of this invention, the "winding direction" of the helix means either clockwise in the direction in which the hose extends or anticlockwise in the direction in which the hose extends, wherein these two winding directions are referred to as being "opposite" to one another.

The "pitch angle" α of a helix for the purposes of this invention is defined as:

$$\alpha = \arctan\left(\frac{h}{U}\right)$$

where h is the pitch height of the helix in the direction in which the hose extends, per revolution around the volume surrounded by the helix, and U is the circumference of the surrounded volume.

The hose according to the invention is distinguished in comparison to known systems by a high bending frequency, a high torsional strength, a high tensional stability, good temperature resistance and increased pressure resistance. The electrically or thermally conductive connection between the electrical conductor and the heating element or an inner hose is ensured, even in the event of very major deformation of the hose, by embedding the electrical conductor in the braid.

The formation of the braid results in the hose assembly having a behaviour which promotes a high mechanical strength on the hose carrying the medium, that is to say, within limits, it acts as a pressure carrier, absorbing the forces when it is bent, pulled or twisted, and, as a result of movement processes which take place reversibly within the braid, guarantees an arrangement, which is always electrically conductive and thermally conductive, between the electrical conductor and the heating element, or the inner hose.

In addition, the design of the braid and the calculated and predictable movement processes of the first and second strands ensure that the stresses within the hose are reduced and that the various hose materials remain in contact as an assembly even after a large number of heating cycles.

In particular, the pitch angle in the range between 50° and 80° results in the hose being particularly highly flexible, without the electrically or thermally conductive connection between the electrical conductor and the heating element or the inner hose being lost in the event of bending. The pitch angle is particularly preferably between the range 65°±5°. This pitch angle results in an optimum compromise between flexibility and robustness.

It is advantageous for the first strands to have a greater radial extent with respect to the longitudinal axis of the hose than the second strands. In this case, the expression radial extent with respect to the longitudinal axis of the hose means the thickness of a braid layer comprising first and second strands of the braid. The wall thickness of the hose can therefore be considerably reduced, thus achieving additional flexibility, without reducing the robustness. It is worthwhile for the first strands to have a radial extent with respect to the longitudinal axis of the hose which corresponds essentially to the radial extent which the electrical conductor has with respect to the longitudinal axis of the hose. The electrical conductor can therefore be embedded in the braid without any radial projection and without forming any undesirable free spaces.

The braid may be wound with a different density. It has been found to be particularly advantageous for the braid to fill 70% to 80% of the hose layer on which the braid extends. The expression "hose layer" means any desired inner layer of the hose which makes contact with the inside of the braid. The remaining proportion may be entirely or partially filled with elastic material, for example of a heating element, or may remain free as desirable movement freedom for the strands.

The braid itself or apart of it may itself be used as a conductor or screen, wherein at least one of the first strands and/or of the second strands of the braid is electrically conductive. It is also possible to provide a plurality of braids, at least one of which comprises first and/or second strands which are all electrically conductive. By way of example, the electrical conductor itself may be in the form of one strand of the first strands of the braid, which strand is electrically conductive.

The electrical conductor and/or the at least one electrically conductive strand of the first strands and/or strand of the second strands may be solid or may be composed of braided conductors as:
  Wire composed of stainless steel, steel or metal alloys,
  Copper wire,
  Tinned copper wire,
  Nickel-plated copper wire or
  Wire cable composed of stainless steel, steel or metal alloys.

Braided conductors composed of nickel-plated copper wire are preferably used here, in order to provide effective protection against corrosion and to ensure contact reliability between the electrical conductor and the heating element, even when subjected to extreme mechanical loads. When braided conductors are used as the electrical conductors in the form of a voltage supply conductor of a heating element, these are formed from fine wires, in order to ensure optimum contact with the heating element, by virtue of their large surface area.

On the other hand, the braid or a part of it may also have first strands and/or second strands which are electrically non-conductive. These strands preferably have a material which is selected from a group comprising:
  Glass silk,
  Mineral fibre,
  Aramid (Kevlar®),
  Polyester,
  Thermoplastic elastomer such as thermoplastic polyetherester-elastomer (TPEE), thermoplastic polyurethane elastomer (TPU) or thermoplastic polyolefin (TPO),
  Low-density polyethylene (LDPE), high-density polyethylene (HDPE) or polypropylene (PP),
  Polyamide (PA),
  Fluoropolymer such as polytetrafluoroethylene (PTFE), perfluoroalkoxylalkane (PFA), perfluoro(-ethylene-propylene)-plastic (FEP), polyvinylidene fluoride (PVDF), ethylene tetrafluoroethylene (ETFE), ethylenechlorotrifluoroethlyene (ECTFE) or polyimide (PI),
  Synthetic polymer such as silicone,
  Technical plastic,
  A foam material composed of these materials and
  A combination of these materials.

On the one hand, these materials have particularly good mechanical characteristics with regard to flexibility, resistance, robustness and elasticity. On the other hand, they are frequently lighter and, for the same volume, can be loaded to a greater extent than electrically conductive strands composed of metal. Furthermore, the surface characteristics allow the strands to slide on one another with particularly low friction and low wear, and with respect to the hose layers with which the braid makes contact on the inside and/or outside. Above all, fluoroplastics such as FEP and PFA support this sliding function to a particular extent.

It is particularly advantageous for the first strands and/or second strands of the braid to be arranged such that they can slide on a hose layer. Once subjected to severe mechanical loads, the braid can thus move and twist locally, and adapt itself to the deformation.

In principle, the braid reverts to the initial position after a local movement, that is to say the braid is optimally reversibly elastic. However, the braid need not assume the previous position again after every movement, but can also remain in this position. All that is ensured is that the necessary electrically conductive or thermally conductive connection is maintained.

In order to achieve this, it is advantageous for the surfaces of the first strands and/or second strands of the braid and/or of the hose layer on which the braid is arranged such that it can slide to be treated, in order to reduce the sliding resistance. By way of example, a treatment such as this may comprise coating or sheathing.

The first and/or second strands may themselves have individual filaments, cords, twisted threads or film, threads or films shaped to form knurling, narrow individual films or a combination thereof. The first and/or second strands may have the same material as one another, or different materials to one another. The cross-sectional shape of the first and/or second strands may also be the same or may differ, and may vary over the length. The strands may also additionally be equipped with strips as film sliding layers.

In a first embodiment of the invention, the electrical conductor is itself used as a heating element. In this case, the electrical conductor is thermally conductively connected to an inner hose which is used to carry a medium to be heated in the hose direction. Embedding the conductor in the braid according to the invention ensures this thermally conductive connection even when subjected to severe mechanical loads.

In an alternative embodiment to this, the electrical conductor is used as one of two voltage supply conductors of a heating element. In this case, the heating element is thermally conductively connected to an inner hose which is used to carry a medium to be heated in the hose direction. In this case, embedding the conductor in the braid according to the invention primarily ensures the electrically conductive contact between the electrical conductor and heating element, even when subjected to severe mechanical loads. Both voltage supply conductors of the heating element are preferably wound in a helical shape parallel to one another, and are embedded in the braid. In this case, the braid furthermore ensures that the necessary separation between the voltage supply conductors is maintained even when subjected to severe mechanical loads, in order to prevent an undesirable short circuit.

Despite a preferably guaranteed movement and deformation freedom of the braid during movements of the hose, specific minimum separations are ensured between the voltage supply conductors. In this case, these minimum separations comply at least with the requirements of the relevant standards with respect to the maximum permissible creepage currents and insulation resistances to be complied with, for example for voltages of 450 V to 750 V between the conductors 11, 13. For relatively small hose diameters, the permissible voltages may also be in the range from 300 V to 500 V. The maximum permissible voltage is dependent on the minimum separation between the conductors provided by the braid, in the worst load case.

It is particularly advantageous for the heating element to have a material which has a positive temperature coefficient. The expression a positive temperature coefficient means that the resistivity of the material increases as the temperature rises. This makes it possible to achieve a homogeneous temperature profile along the hose in a simple manner, since the thermal power output on reaching a specific operating temperature automatically falls to a low residual power, so that the only areas that are heated are those which are below this operating temperature. This is particularly advantageous in the event of sharp bends, since they lead to local increases or decreases in the thermal power density, and the heating element is no longer heated in these local areas on reaching the corresponding operating temperature.

The heating element preferably has a carbon-doped material which is selected from a group comprising:

Thermoplastic elastomer such as thermoplastic polyether-ester-elastomer (TPEE), thermoplastic polyurethane elastomer (TPU) or thermoplastic polyolefin (TPO), Low-density polyethylene (LDPE), high-density polyethylene (HDPE) or polypropylene (PP), Polyamide (PA), Fluoropolymer such as polytetrafluoroethylene (PTFE), perfluoroalkoxylalkane (PFA), perfluoro(-ethylene-propylene)-plastic (FEP), polyvinylidene fluoride (PVDF), ethylene tetrafluoroethylene (ETFE), ethylenechlorotrifluoroethylene (ECTFE) or polyimide (PI), Synthetic polymer such as silicone, Technical plastic, A foam material composed of these materials and A combination of these materials.

Doping with carbon leads to the electrically conductive characteristics of these materials which are required in order to use them as an electrical heating element. The doping is in this case preferably selected such that the heating element has a positive temperature coefficient. The listed materials furthermore have the characteristic that they can flow well, because of their composition. In addition, the selected material is distinguished after stabilization by high flexibility in order in this way to withstand the various mechanical loads such as bending, pulling or twisting. Furthermore, the materials are lighter than metallic heating elements, as a result of which the hose can be made lighter.

On the one hand, the material of this heating element is composed such that it can flow well in the production process, thus allowing even very small areas within the braid to be filled, with the strands being enclosed and permanently bonded, without any undesirable free spaces being created. On the other hand, after manufacture and use, the heating element is mechanically bonded well to the supply conductors which are embedded in the braid as the voltage supply for the heating element, and they can therefore react flexibly to the mechanical load, permanently.

In one particularly advantageous embodiment of the invention, two braids are provided, wherein the heating element is arranged between the first and the second braid. The thermally conductive connection between the heating element and the inner hose can in this case be ensured in that the heating element can flow well during hose production, as a result of which the intermediate spaces between the strands of the braid are filled by the heating element, and a thermally conductive connection is maintained in the inward direction.

This is because the braid preferably occupies only 70% to 80% of the hose layer onto which it is wound. The remaining component can in this embodiment be occupied entirely or partially by the heating element. In addition, the inner braid can also be designed to conduct heat well.

A further aspect of this invention relates to a method for production of a flexible, electrically heatable hose, wherein an electrical conductor is used as one of two voltage supply conductors for a heating element, wherein the heating element is thermally conductively connected to an inner hose which is used to carry a medium to be heated in the hose direction. The method according to the invention has the following steps:

Braiding of a hose layer with a braid and an elongated electrical conductor,
such that this electrical conductor extends in a helical shape in the hose direction and is embedded in the braid,
such that the braid has first and second strands,
such that the first strands extend in a helical shape in the hose direction in the same winding direction as the electrical conductor,
such that the second strands extends in a helical shape in the hose direction in the opposite winding direction to the electrical conductor, and
the pitch angle of the electrical conductor, which extends in a helical shape in the hose direction, of the first strands and of the second strands is between 50° and 80°,
application of a heating element composed of carbon-doped plastic which has a positive temperature coefficient, such that the heating element is electrically conductively connected to the electrical conductor.

The heating element is preferably applied by extrusion of a thermoplastic, by winding plastic tape around and sintering at temperatures up to 580° C., or by adhesive bonding of wound-on plastic strip layers.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

The present invention will be explained in more detail in the following text with reference to the advantageous embodiments which are illustrated in the attached drawings.

FIG. 1 shows a perspective view of one advantageous embodiment of a hose according to the invention.

FIGS. 2 to 18 in each case show cross-sectional views of different advantageous embodiments of a hose according to the invention.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

FIG. 1 shows one advantageous embodiment of a flexible, electrically heatable hose according to the invention which has an inner hose 1, where the inner hose 1 is intended to contain a medium which can flow, and to carry this medium in the direction in which the hose extends. A thermally conductive hose layer 3 is arranged around the inner hose 1. A braid 5 extends on this hose layer 3 and is wound in a helical shape around the hose layer 3 in the hose direction in the form of first strands 7 and second strands 9. The first strands 7 of the braid 5 extend in an anticlockwise helical shape in the direction of that end of the hose which is illustrated in FIG. 1, while in contrast the second strands 9 of the braid 5 extend in the opposite direction to this, in a clockwise helical shape, to the illustrated end of the hose. The first strands 7 and the second strands 9 therefore crossover.

In the illustrated example, the first strands 7 and the second strands 9 are woven with one another, that is to say one strand of the first strands 7 runs over one strand of the second strands 9, and one strand of the second strands 9 runs over one strand of the first strands 7, alternately in the direction in which a strand extends. Although this weaving is advantageous for the robustness of the braid 5, it is not, however, essential. The first strands 7 may also run one behind the other above or below the second strands 9 entirely or a number of times in places.

In this case, it is advantageous for the first strands 7 to have a greater radial extent than the second strands 9 with respect to the longitudinal axis of the hose (not shown in FIG. 1). In this case, the expression radial extent with respect to the longitudinal axis of the hose means the thickness of a layer which is formed by the first strands 7 and the second strands 9 of the braid 5. The wall thickness of the hose can be reduced considerably, so as to achieve additional flexibility, without reducing the robustness. It is worthwhile for the first strands 7 to have a radial extent with respect to the longitudinal axis of the hose which corresponds essentially to the radial extent which the electrical conductors 11, 13 have with respect to the longitudinal axis of the hose. This allows the electrical conductors 11, 13 to be embedded in the braid 5 without any radial projection and without forming undesirable free spaces. The second strands 9 can be formed with a radial extent which is as small as possible, for example in the form of flat films or strips.

The pitch angle of the first strands 7 and second strands 9 which extend in a helical shape in the hose direction is about 65°. This means that the first strands 7 and the second strands 9 cross at an acute angle of about 50°, and not at a right angle of about 90°, as will be the case if the pitch angle were to be 45°. Because the pitch angle is 65°, the braid 5 is many times more flexible than in the case of pitch angles of 45° or less. On the other hand, a greater pitch angle would lead to less robustness in the braid 5. In this case, it has been found that, depending on the application requirement, the pitch angle can be chosen to be between 50° for robust braids 5 and 80° for particularly flexible braids 5, in order always to ensure a minimum level of robustness and flexibility. For the same reason, the braid 5 forms an assembly, which is looser to a certain extent, of first braids 7 and second braids 9 occupying 70% to 80% of the hose layer 3. Although a greater density of strands would be more robust, it will be less flexible, however, while in contrast a reduced density would be less robust, although more flexible.

An electrical conductor 11 which has been embedded or woven into the braid 5 in the same way as a strand of the first strands 7 extends parallel to the first strands 7, that is to say in a helical shape in the same anticlockwise winding direction towards the illustrated end. In this embodiment, the electrical conductor 11 is used as one of two voltage supply conductors 11, 13 for the heating element 15. In this case, the heating element 15 is a carbon-doped plastic which can flow well during an extrusion step during the production process of the hose, and is applied to the braid 5 as a layer. The heating element 15, which can still flow well, partially passes through the braid 5 and partially or completely fills free intermediate spaces between the first strands 7 and/or the second strands 9 before it plasticizes as an elastically flexible plastic. Inter alia, this results in an electrical contact being made between the electrical conductor 11 and the heating element 15. As a result of the electrical conductor 11 being embedded in the braid 5, this electrical connection is, however, also ensured permanently and over the entire length of the heating element 15, even when the hose is subjected to severe mechanical loads.

It is advantageous for the second electrical conductor 13 of the two voltage supply conductors 11, 13 of the heating element 15 to be embedded in the braid 5 in the same manner as the first electrical conductor 11. An electrical contact with the heating element 15 is then also ensured in this case. The first electrical conductor 11 and the second electrical conductor 13 run parallel to one another in the form of a double helix and in this case are as far as possible away from one another, in order to preclude a short circuit. The embedding in the braid 5 ensures that a separation which is adequate for this purpose is ensured even when subjected to severe mechanical loads. The first strands 7 and the second strands 9 are in this exemplary embodiment designed to be non-conductive in order that they do not cause any short circuit between the conductors 11, 13, but isolate the conductors 11, 13 from one another, in order that the current flows exclusively via the heating element 15 when voltage is applied.

When a voltage is now applied between the voltage supply conductors 11, 13, then a current flows between the conductors 11, 13 via the carbon-doped plastic of the heating element 15. Thermal power is produced by the electrical resistance of the heating element 15. The resultant heat is transmitted via the thermally conductive hose layer 3 to the inner hose 1, which then emits the heat to the medium which can flow and is located in it. The heating element 15 is therefore thermally conductively connected to the inner hose 1. This thermally conductive connection may be provided by means of the thermally conductive characteristics of the braid 5, or the heating element 15 may also pass through the braid 5, thus resulting in a direct contact with the thermally conductive hose layer 3. The thermally conductive hose layer 3 is not necessarily required, because the inner hose 1 can also itself make contact with the braid 5 and/or the heating element 15.

It is particularly advantageous for the carbon-doped plastic of the heating element 15 to have a positive temperature coefficient, as a result of which the resistance of the heating element 15 increases as the temperature rises. The process starts initially from a dynamic thermal equilibrium in an electrically heated hose, which is not moved and in which a medium which is flowing at a constant flow rate in the hose is kept at a specific temperature by electrical heating with a constant heat output. If severe mechanical loads, such as bending or the like, now act on the hose, the heat output to the medium flowing in the inner hose 1 changes locally. The temperature in the heating element 15 therefore also changes locally. The local change in the heat output generally comprises a heat accumulation which leads to a local temperature increase. The temperature profile along the hose is therefore inhomogeneous, which is undesirable for certain applications. If the electrical resistance were to have the normal negative temperature coefficient, the local temperature increase would lead to a counter productive local increase in the thermal power in the heating element 15, in a local area which had already been overheated in any case. In contrast, if the heating element 15 has a positive temperature coefficient, the resistance rises with the temperature, as a result of which considerably less thermal power is produced by the heating element 15 at points where the temperature has been increased by mechanical accumulation of heat. The temperature profile along the hose therefore remains more homogeneous despite high mechanical loads.

In addition, the hose illustrated in FIG. 1 has a further line 17 in addition to the electrical conductor 11, which further line 17 is woven or embedded in a helical shape in the braid 5, parallel to the electrical conductor 11. By way of example, this further line 17 may be a sensor line or a signal transmission line.

The heating element 15 is surrounded by a sheath 19, in order to provide robustness and for protection against external influences. As illustrated, the sheath 19 may have similar or identical characteristics to the braid 5, or else may be designed differently, for example by being extruded integrally or comprising only a winding helix. The sheath 19 may also be formed from metallic strands, as a result of which the sheath 19 acts as an electrical screen against external electrical fields.

Unless explicitly stated to the contrary, the type of braid 5 illustrated by way of example in FIG. 1 can also be transferred analogously to the exemplary embodiments in FIGS. 2 to 20, although certain geometric features of the braid 5 cannot be seen in the cross-sectional view. In addition, the advantageous characteristics of the heating element 15 can be transferred to all the embodiments.

Figure 2:
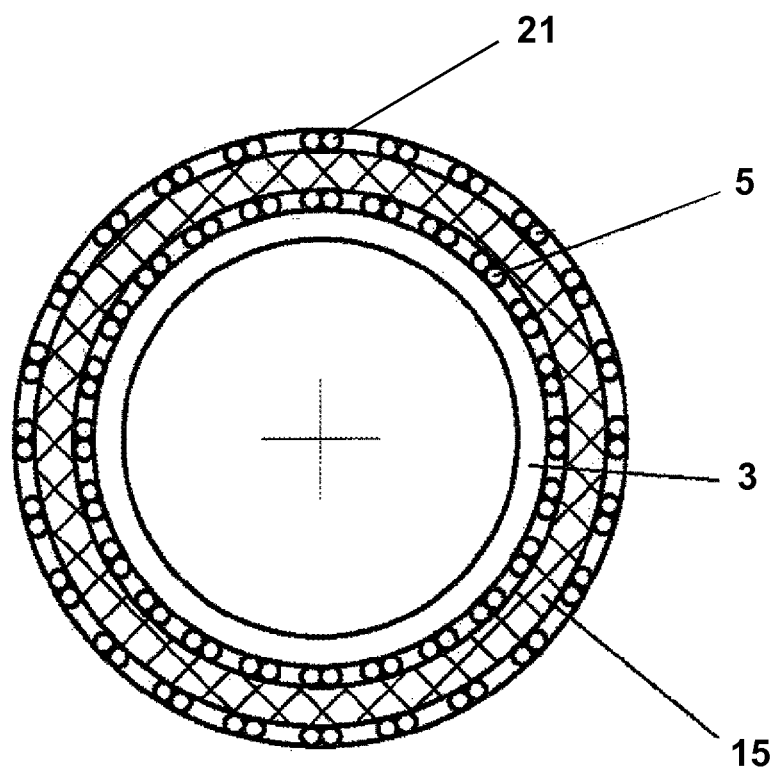

FIG. 2 shows a flexible, electrically heatable hose having a thermally conductive hose layer 3, a first braid 5, a second braid 21 and a heating element 15. In this case, the thermally conductive hose layer 3 is suitable and designed to carry a medium which can flow, in its interior. The heating element 15 is in this case arranged between the first braid 5 and the second braid 21. In the case of the first braid 5 and the second braid 21, in each case at least one of the first strands and/or of the second strands of the braids 5, 21 is electrically conductive. All the strands of both braids 5, 21 are preferably electrically conductive. When a voltage is now applied between the braids 5, 21, then a heating current flows in the radial direction through the heating element 15, which is arranged between the braids 5, 21.

Figure 3:
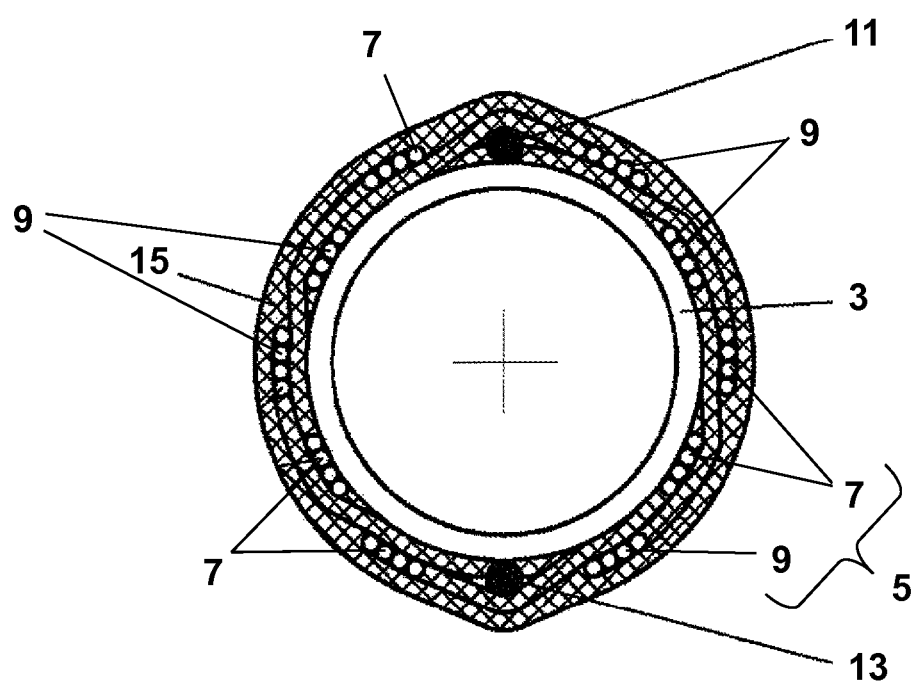

In the exemplary embodiment shown in FIG. 3, a braid 5 is wound around a thermally conductive hose layer 3, with the braid 5 having the first strands 7 and the second strands 9. The first strands 7 and the second strands 9 are in this case illustrated in the form of a half section, indicating the helical extent. Analogously to the embodiment shown in FIG. 1, two electrical conductors 11, 13 are embedded in the braid 5 in the form of a double helix, as voltage supply conductors for a heating element 15. In this case, the heating element 15 is formed by an outer layer which can flow well during an extrusion step during the process of producing the hose and can pass completely through the free spaces in the braid 5 on application. In this case, the heating element 15 is illustrated as being transparent, in order to make it possible to see the half section of the braid 5. In this case, the heating current flows essentially tangentially along the heating element 15 between the conductors 11, 13.

Figure 4:
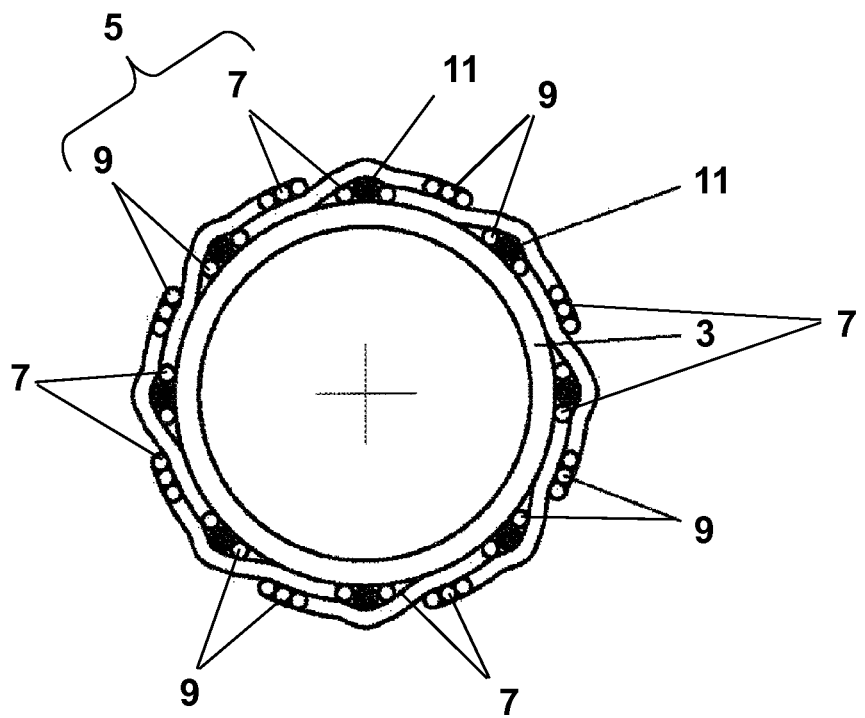

In FIG. 4, a multiplicity of electrical conductors 11 are embedded in one braid 5 which, as already illustrated in FIG. 3, has first strands 7 and the second strands 9, which are shown in the form of a half section, in order to illustrate the helical extent. In this case, the electrical conductors 11 themselves act as a heating element in the form of heating conductors. In this case, the heating conductors 11 may be formed from carbon-doped plastic and/or may be connected in series with one another.

Figure 5:
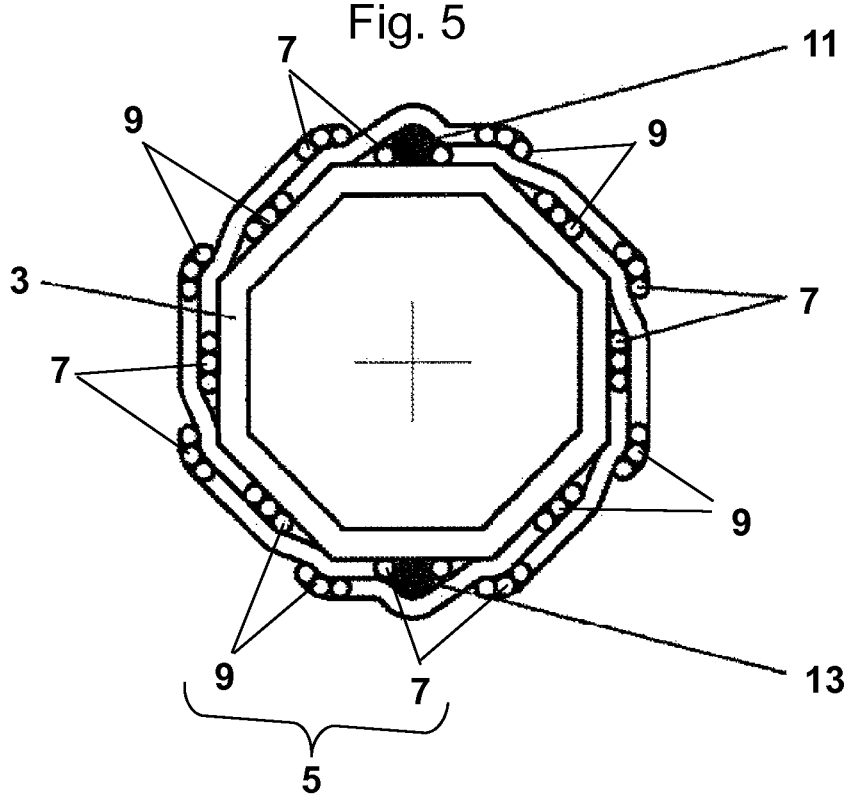

FIG. 5 shows a hose which is very similar to the embodiment shown in FIGS. 1 to 4, although the hose in FIG. 5 has an octagonal cross section. In this hose, a heating element 15 can also be provided as an autonomous element. However, one or both of the electrical conductors 11, 13 itself or themselves can also be used as a heating element, since they are thermally conductively connected to the thermally conductive hose layer 3 which in this case is designed and is suitable for carrying a medium which can flow, in its interior.

Figure 6:
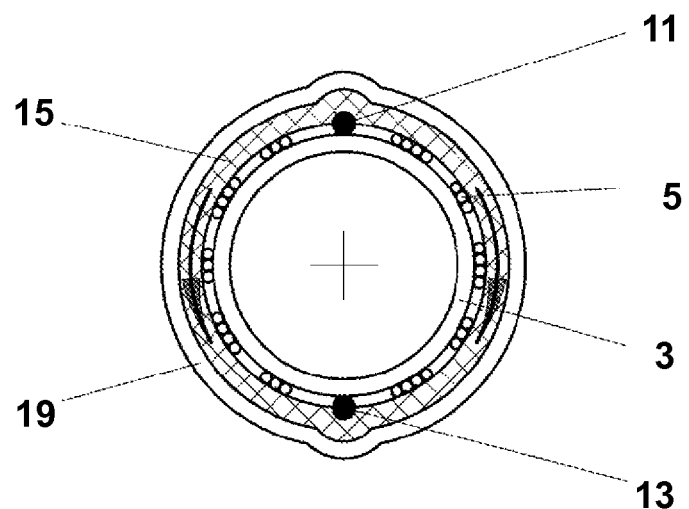
Figure 7:
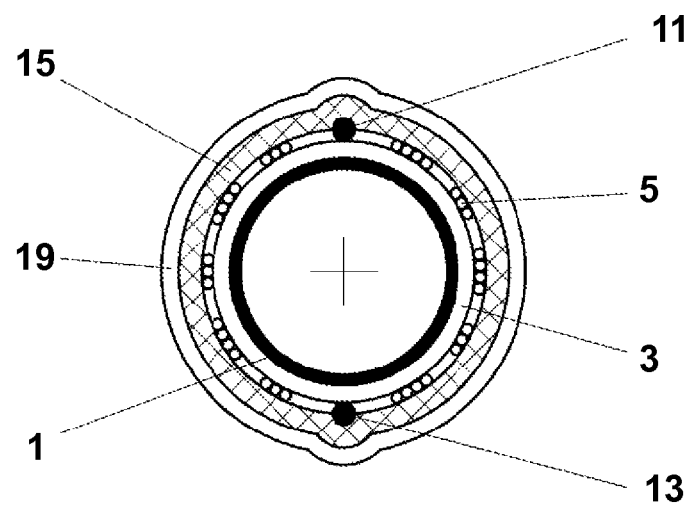

FIGS. 6 and 7 show a hose which is very similar to the embodiment shown in FIG. 1. In comparison to FIG. 6, a replaceable inner hose 1 is provided in FIG. 7 while, in contrast, the thermally conductive hose layer 3 in FIG. 6 is itself used to carry a medium which can flow. In both embodiments, a braid 5 with two embedded electrical conductors 11, 13 is arranged around the thermally conductive hose layer 3, with a heating element 15 being located around this. On the outside, the hose is protected by an integral sheath 19. The arrows in FIG. 6 indicate the current flow from the electrical conductor 11 through the heating element 15 to the electrical conductor 13 when an electrical voltage is applied between the electrical conductors 11, 13.

Figure 8:
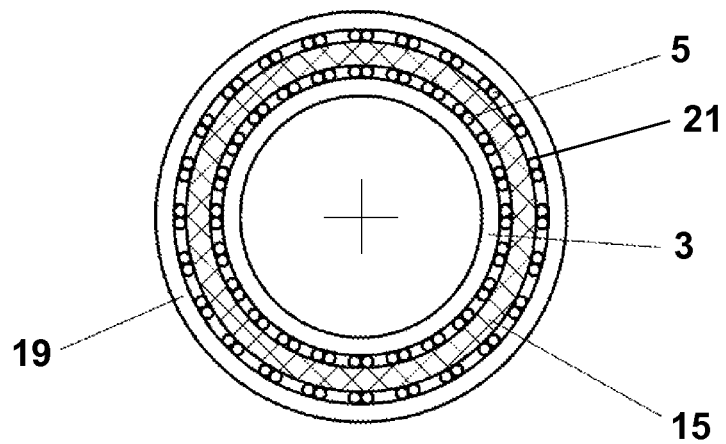
Figure 9:
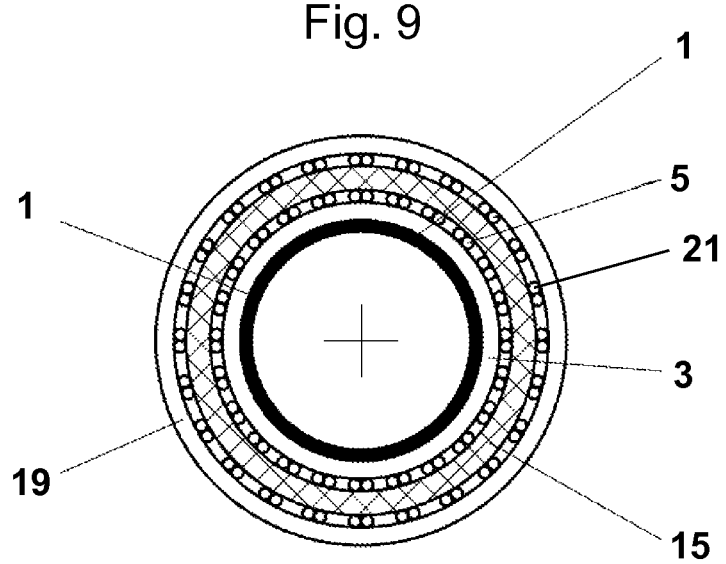

FIGS. 8 and 9 differ from the embodiment shown in FIG. 2 only by having an integral sheath 19 which surrounds the outer, second braid 21. A replaceable inner hose 1 is additionally also provided in FIG. 9, in order to carry a medium which can flow in it. In this case, the further braid 21 is used as an additional pressure carrier braid, in order to make it possible to better absorb the pressure forces which occur in the interior of the hose.

Figure 10:
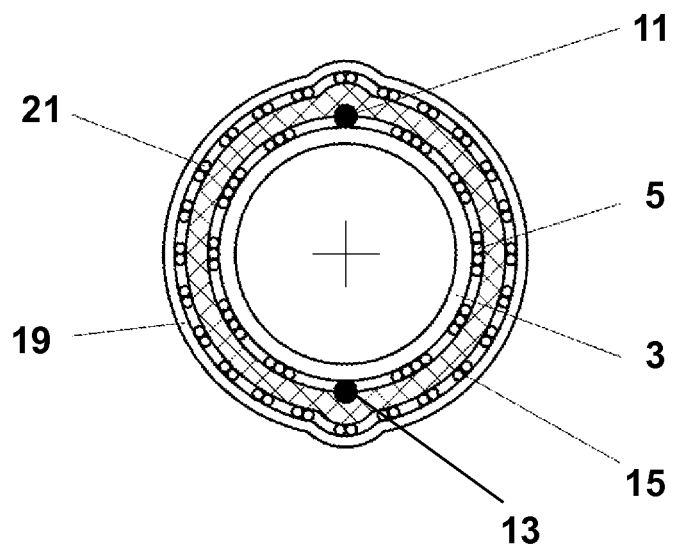

The embodiment in FIG. 10 is similar to the embodiment shown in FIG. 1, although the strands 7, 9 of the inner braid 5 and of the outer braid 21 are not electrically conductive. A first electrical conductor 11 and a second electrical conductor 13 are embedded in the first braid 5, in order to supply voltage to the heating element 15.

Figure 11:
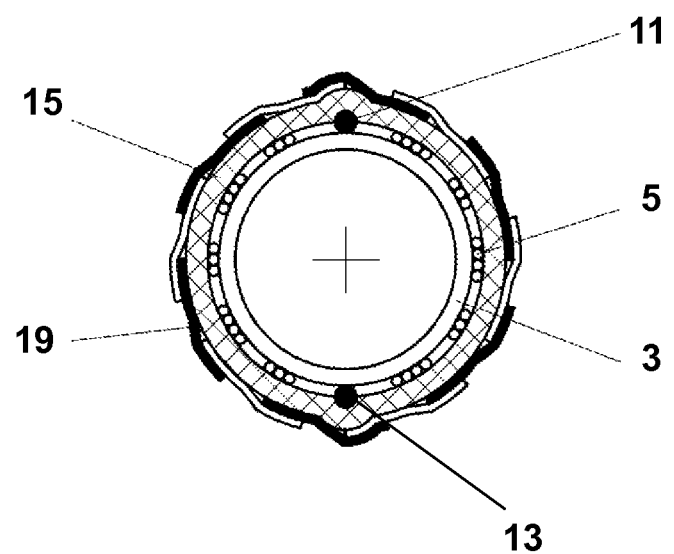
Figure 12:
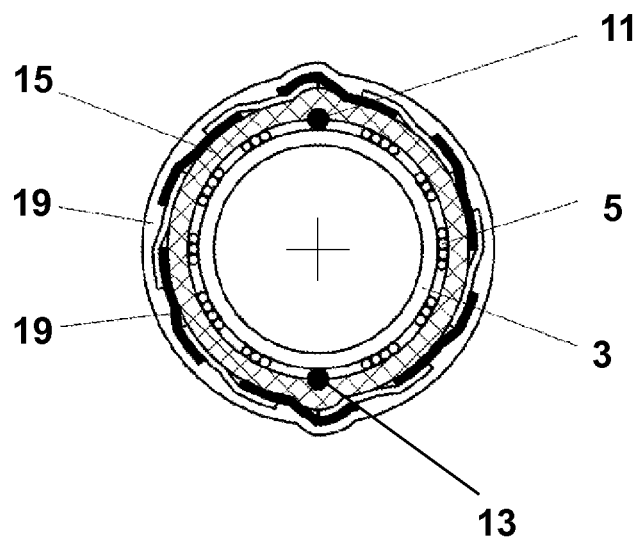

FIG. 11 shows an exemplary embodiment which is analogous to that in FIG. 6, in which the sheath 19 is not integral, but is in the form of a helical winding of mutually overlapping material webs. In FIG. 12, a sheath 19 such as this additionally has an integral outer composite layer, which encloses the helical winding of mutually overlapping material webs.

Figure 13:
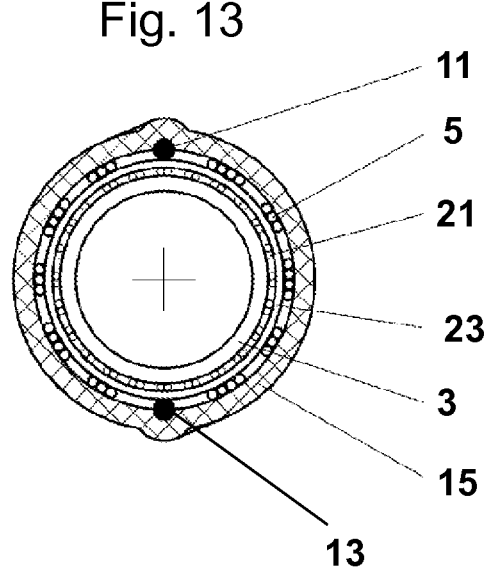

The embodiment in FIG. 13 shows an inner braid 21, which makes direct contact with the innermost thermally conductive hose layer 3 and is used in this case as a pressure carrier layer in order that the hose withstands the internal pressure of the medium being carried in it. The inner braid 21 is followed by an insulating layer 23, on which an outer braid 5 is in turn arranged, which is itself electrically non-conductive, but in which a first electrical conductor 11 and a second electrical conductor 13 are embedded. On the outside, the hose is closed by the heating element 15, which is electrically connected to the conductors 11, 13.

Figure 14:
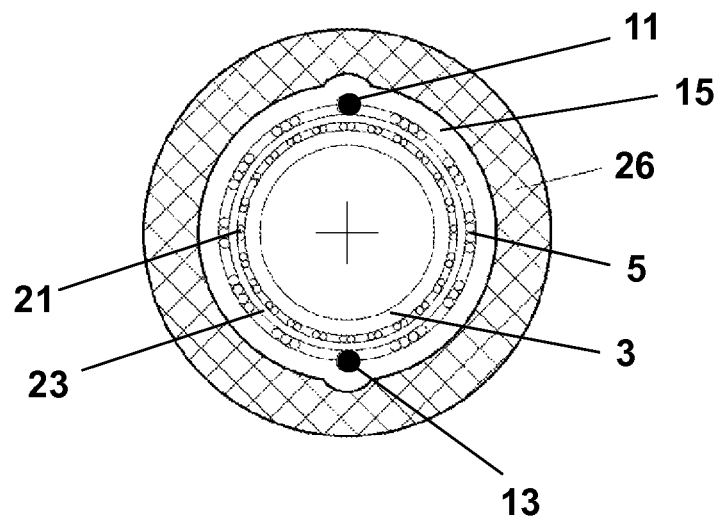

In the exemplary embodiment in FIG. 14, the outer insulating layer 26 is formed from foamed plastic. A heating element 15 is located within the insulating layer 26 and is supplied with voltage by electrical conductors 11, 13, surrounding the outer braid 5, in which the electrical conductors 11, 13 are embedded. In addition to the electrically insulating characteristic, the outer insulating layer 26 makes use of the insulating effect of the foamed material, in order to minimize the requirement for heat power. Additional insulating materials can thus be saved, and a higher efficiency is achieved with a hose diameter that is as small as possible. The outermost layer of the insulating layer 26 can also be compressed, in order to achieve the mechanical strength required for an outer skin. Although this reduces the flexibility in comparison to a design with foam that is not compressed on the outside, this makes it possible, however, to use a hose such as this without any further external protection.

Figure 15:
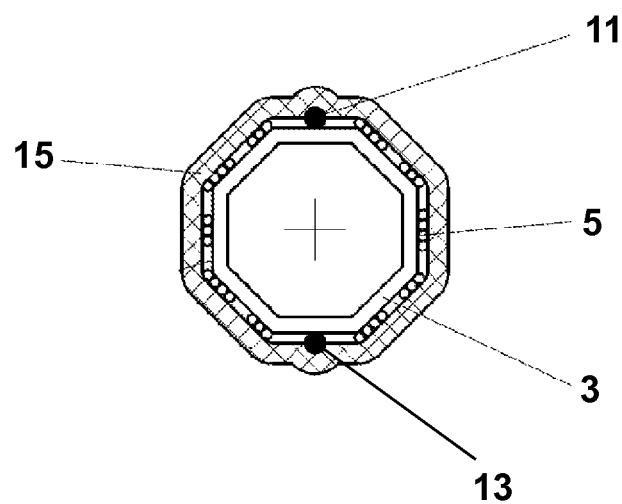

FIG. 15 shows a hose which is very similar to the embodiment shown in FIG. 5, with the hose in FIG. 15 having a heating element 15 which is fed via the electrical conductors 11, 13, and with the hose having an octagonal cross section.

Figure 16:
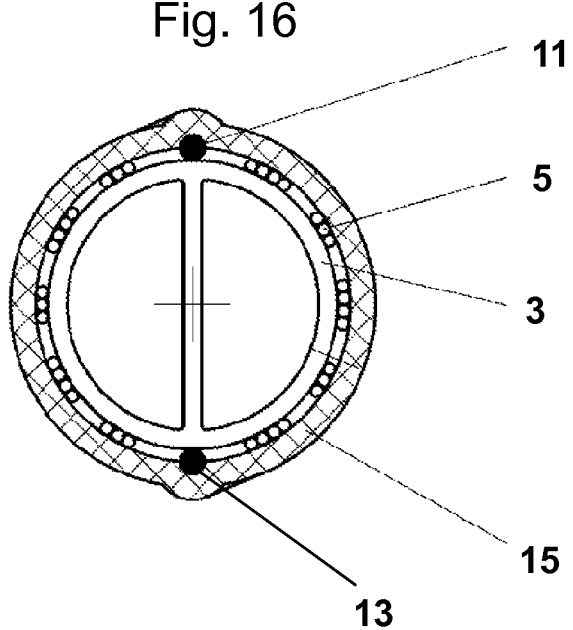

The embodiment of the hose illustrated in FIG. 16 has two chambers which are separated from one another and are each designed to separately carry a medium which can flow, in the hose direction. This makes it possible to subject each of two media which can flow to the same amount of heat as they flow through, at the same time, without the media being mixed in the hose. There may be any desired number of chambers in this case. Otherwise, this embodiment corresponds to that in FIG. 15.

Figure 17:
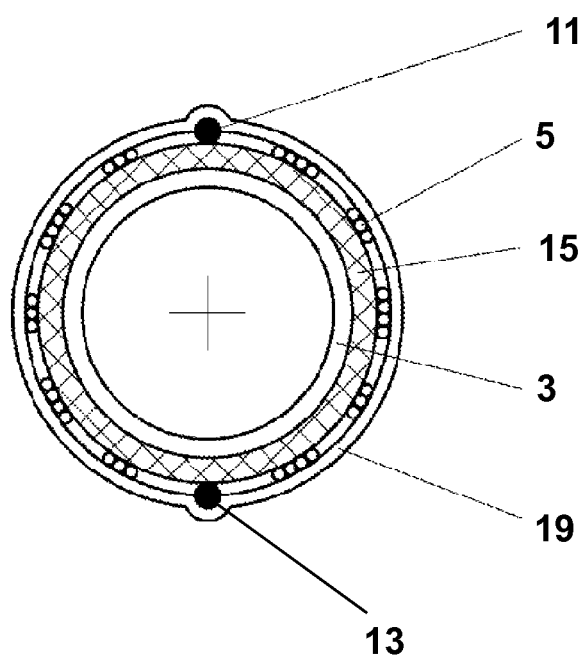

As can be seen from FIG. 17, the heating element 15 may also be located directly on the thermally conductive hose layer 3, with the braid 5 being wound onto the heating element 15. The electrical conductors 11, 13 which are embedded in the braid 5 then make electrical contact with the outer surface of the heating element 15. On the outside, the braid 5 is surrounded by an integral sheath 19.

Figure 18:
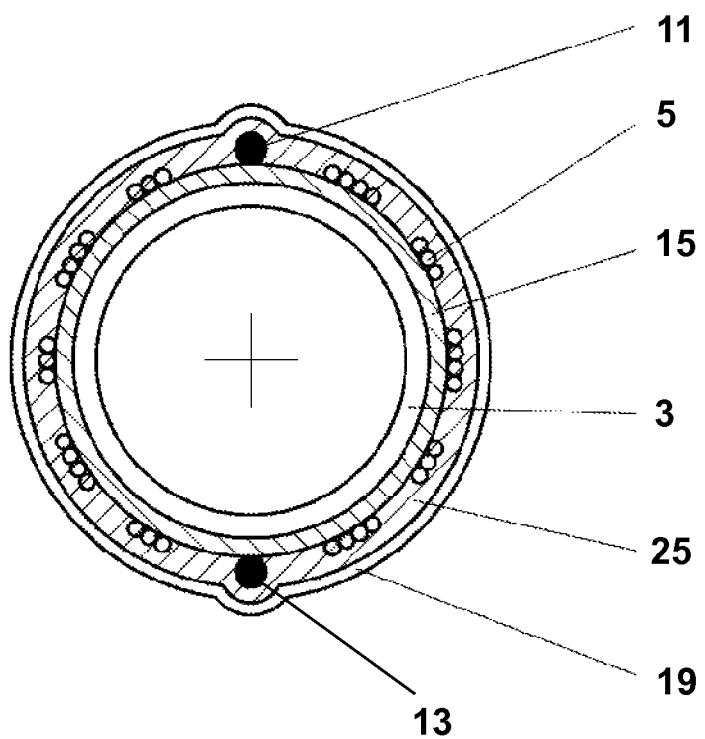

The embodiment in FIG. 18 has a first heating element 15 and a second heating element 25. The first heating element 15 is applied directly to the thermally conductive hose layer 3 and is surrounded by a braid 5 in which electrical conductors 11, 13 are embedded, which make electrical contact with the first heating element 15. On the outside, the braid 5 is surrounded by an applied second heating element 25 such that the second heating element 25 also makes electrical contact with the conductors 11, 13 which are embedded in the braid 5. On the outside, the second heating element 25 is surrounded by an integral sheath 19.

All the features of the various exemplary embodiments which are illustrated in the figures can be combined in any desired form in order to create a suitable hose according to the invention.

However, all the illustrated embodiments have the common feature that they have high torsional strength, high tension stability, good temperature resistance and increased pressure resistance. It is also ensured that the electrically or thermally conductive connection between the electrical conductor and a heating element and an inner hose, respectively, is ensured, by embedding the electrical conductor in the braid, even in the event of very severe hose deformation.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A flexible, electrically heatable hose extending along a longitudinal axis in a hose direction and configured for containing a flowable medium, said hose comprising:
an elongated electrical conductor extending in a helical shape in the hose direction to define a winding direction;
said electrical conductor being embedded in a braid,
said braid including first and second strands,
said first strands extending in a helical shape in the hose direction in a first strands winding direction that is the same as the winding direction of the electrical conductor,
said second strands extending in a helical shape in the hose direction in a second strands winding direction that is the opposite of the winding direction of the electrical conductor,
said electrical conductor presenting a pitch angle of the first strands and of the second strands that extends in a helical shape in the hose direction,
said pitch angle being between 50° and 80°,
wherein the electrical conductor comprises a heating element,
said electrical conductor being thermally conductively connected to an inner hose used to carry the medium to be heated in the hose direction.

2. A flexible, electrically heatable hose extending along a longitudinal axis in a hose direction and configured for containing a flowable medium, said hose comprising:
an elongated electrical conductor extending in a helical shape in the hose direction to define a winding direction;
said electrical conductor being embedded in a braid,
said braid including first and second strands,
said first strands extending in a helical shape in the hose direction in a first strands winding direction that is the same as the winding direction of the electrical conductor,
said second strands extending in a helical shape in the hose direction in a second strands winding direction that is the opposite of the winding direction of the electrical conductor,
said electrical conductor presenting a pitch angle of the first strands and of the second strands that extends in a helical shape in the hose direction,
said pitch angle being between 50° and 80°,
further comprising a heating element thermally conductively connected to an inner hose used to carry the medium to be heated in the hose direction,
said electrical conductor comprising one of two voltage supply conductors of the heating element.

3. The flexible, electrically heatable hose according to claim 2,
wherein the first strands present a greater radial extent with respect to the longitudinal axis of the hose than a radial extent of the second strands.

4. The flexible, electrically heatable hose according to claim 2,
wherein the pitch angle of the electrical conductor is 65°±5°.

5. The flexible, electrically heatable hose according to claim 2,
wherein the first strands present a radial extent with respect to the longitudinal axis of the hose which corresponds essentially to a radial extent of the electrical conductor with respect to the longitudinal axis of the hose.

6. The flexible, electrically heatable hose according to claim 2,
wherein the braid fills 70% to 80% of a hose layer on which the braid extends.

7. The flexible, electrically heatable hose according to claim 2,
wherein at least one of the first strands and the second strands of the braid is electrically conductive.

8. The flexible, electrically heatable hose according to claim 7, wherein the electrical conductor is in the form of one strand of the first strands of the braid, said one strand being electrically conductive.

9. The flexible, electrically heatable hose according to claim 7,
wherein at least one of the electrical conductor and the at least one electrically conductive strand is solid or is composed of braided conductors comprising at least one material selected from the group consisting of wire of stainless steel, steel, or metal alloys; copper wire; tinned copper wire; nickel-plated copper wire; and wire cable of stainless steel, steel, or metal alloys.

10. The flexible, electrically heatable hose according to claim 2,
wherein at least one of the first strands and the second strands of the braid is electrically non-conductive.

11. The flexible, electrically heatable hose according to claim 10,
wherein the at least one electrically non-conductive strand comprises a material selected from the group consisting of glass silk, mineral fibre, aramid (Kevlar®), polyester, thermoplastic elastomer, low-density polyethylene (LDPE), high-density polyethylene (HDPE), polypropylene (PP), polyamide (PA), fluoropolymer, synthetic polymer, and technical plastic.

12. The flexible, electrically heatable hose according to claim 2,
wherein at least one of the first strands and the second strands of the braid are arranged such that the strands can slide on a hose layer.

13. The flexible, electrically heatable hose according to claim 12,
wherein at least one of the first strands, the second strands and the hose layer on which the braid is arranged present a surface that is treated to reduce sliding resistance.

14. The flexible, electrically heatable hose according to claim 12,
wherein at least one of the first strands, the second strands and the hose layer on which the braid is arranged present a surface that is coated or sheathed to reduce sliding resistance.

15. The flexible, electrically heatable hose according to claim 2,
wherein at least one of the first and second strands comprises at least one material selected from the group of individual filaments, cords, twisted threads or film, threads or films shaped to form knurling, and narrow individual films.

16. The flexible, electrically heatable hose according to claim 2, wherein the heating element comprises a material with a positive temperature coefficient.

17. The flexible, electrically heatable hose according to claim 2,
wherein the heating element comprises a carbon-doped material selected from the group consisting of thermoplastic elastomer, low-density polyethylene (LDPE), high-density polyethylene (HDPE), polypropylene (PP), polyamide (PA), fluoropolymer, synthetic polymer, and technical plastic.

18. The flexible, electrically heatable hose according to claim 2, further comprising a first braid and a second braid, wherein the heating element is arranged between the first braid and the second braid.

19. A method of producing the flexible, electrically heatable hose according to claim 2, said method comprising the steps of:
braiding a hose layer with a braid and an elongated electrical conductor, such that the electrical conductor extends in a helical shape in the hose direction and is embedded in the braid; and
applying a heating element comprising carbon-doped plastic with a positive temperature coefficient, such that the heating element is electrically conductively connected to the electrical conductor.

20. The producing method according to claim 19, wherein the heating element is applied by a technique selected from the group of extruding a thermoplastic, winding plastic tape and sintering at temperatures up to 580° C., and adhesive bonding of wound-on plastic strip layers.

\* \* \* \* \*